(12) United States Patent
Matsuura

(10) Patent No.: US 11,192,359 B2
(45) Date of Patent: Dec. 7, 2021

(54) LIQUID DISCHARGE APPARATUS, CONTROL METHOD FOR LIQUID DISCHARGE APPARATUS, AND MEDIUM STORING PROGRAM EXECUTABLE BY LIQUID DISCHARGE APPARATUS

(71) Applicant: Brother Kogyo Kabushiki Kaisha, Nagoya (JP)

(72) Inventor: Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/938,360

(22) Filed: Jul. 24, 2020

(65) Prior Publication Data

US 2021/0031509 A1  Feb. 4, 2021

(30) Foreign Application Priority Data

Jul. 29, 2019  (JP) .............................. JP2019-139127

(51) Int. Cl.
*B41J 2/045* (2006.01)
*B41J 2/21* (2006.01)

(52) U.S. Cl.
CPC ......... *B41J 2/0456* (2013.01); *B41J 2/04586* (2013.01); *B41J 2/2132* (2013.01)

(58) Field of Classification Search
CPC ..... B41J 2/0456; B41J 2/04586; B41J 2/2132
See application file for complete search history.

(56) References Cited

U.S. PATENT DOCUMENTS

| 7,290,854 | B2 | 11/2007 | Mizutani et al. |
| 7,527,351 | B2 | 5/2009 | Hirano et al. |
| 9,039,121 | B2 | 5/2015 | Sudo et al. |
| 9,254,647 | B2 * | 2/2016 | Hasegawa .................. B41J 2/07 |
| 2005/0062774 | A1 | 3/2005 | Kusunoki |
| 2005/0122377 | A1 | 6/2005 | Mizutani et al. |
| 2008/0024536 | A1 | 1/2008 | Hirano et al. |
| 2014/0292866 | A1 | 10/2014 | Sudo et al. |

FOREIGN PATENT DOCUMENTS

| JP | H02-078571 A | 3/1990 |
| JP | 2005-186610 A | 7/2005 |
| JP | 2006-231924 A | 9/2006 |
| JP | 2008-100485 A | 5/2008 |
| JP | 2014-188973 A | 10/2014 |

* cited by examiner

*Primary Examiner* — Thinh H Nguyen
(74) *Attorney, Agent, or Firm* — Banner & Witcoff, Ltd.

(57) ABSTRACT

A liquid discharge apparatus includes: a head which discharges a plurality of kinds of liquids; and a controller. The controller is configured to: calculate a total discharge amount of the liquids for a unit area of a recording medium based on discharge data for the unit area; determine whether the total discharge amount exceeds a predefined amount; in a case that the controller has determined that the total discharge amount exceeds the predefined amount, divide the discharge data into a plurality of pieces of divided discharge data, each of the pieces of divided discharge data indicating the total discharge amount of not more than the predefined amount; and perform a plurality of divided discharges for the unit area based on the pieces of divided discharge data.

12 Claims, 12 Drawing Sheets

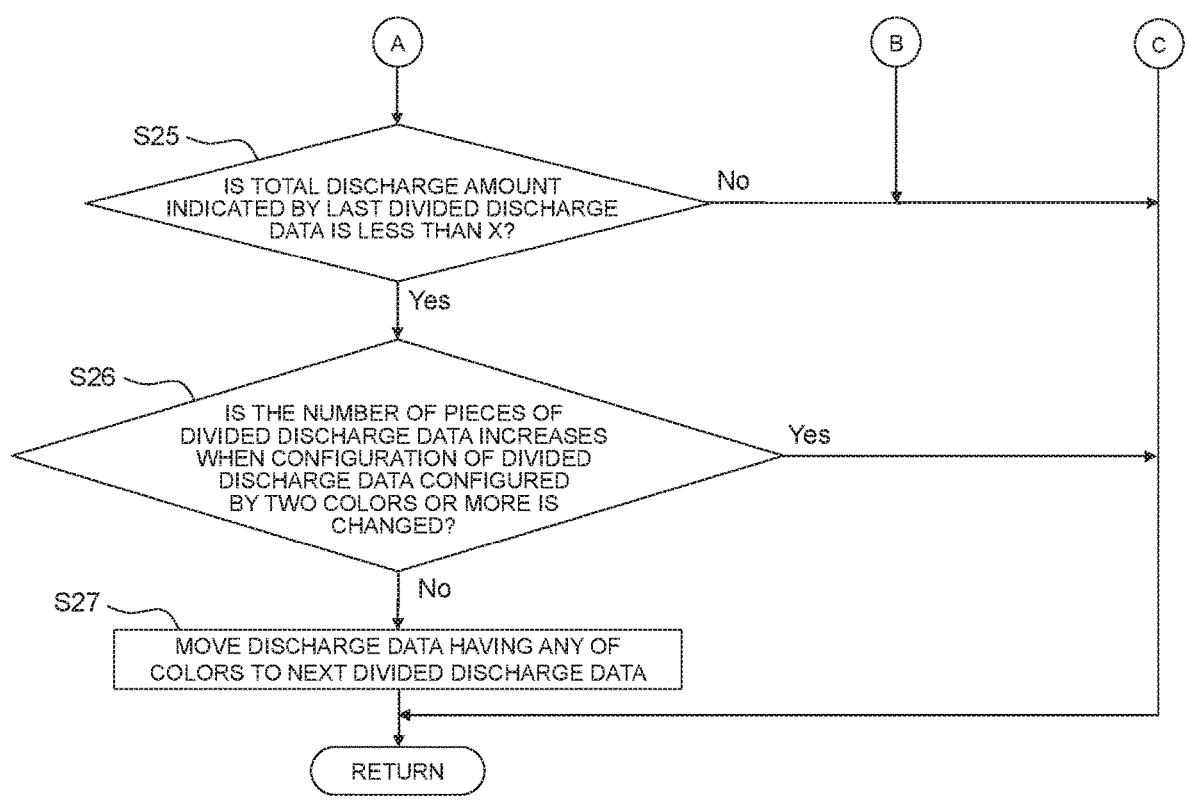

Fig. 7

CASE WHERE X = 15 IS SATISFIED (UNIT: pl)

| | BEFORE DIVIDING | AFTER DIVIDING | | | | |
|---|---|---|---|---|---|---|
| | DISCHARGE AMOUNT | DISCHARGE AMOUNT IN FIRST SCAN | DISCHARGE AMOUNT IN SECOND SCAN | DISCHARGE AMOUNT IN THIRD SCAN | DISCHARGE AMOUNT IN FOURTH SCAN | DISCHARGE AMOUNT IN FIFTH SCAN |
| C | 20 | 15 | 5 | 0 | 0 | 0 |
| M | 20 | 0 | 10 | 10 | 0 | 0 |
| Y | 20 | 0 | 0 | 5 | 15 | 0 |
| K | 15 | 0 | 0 | 0 | 0 | 15 |
| TOTAL DISCHARGE AMOUNT x | 75 | 15 | 15 | 15 | 15 | 15 |

Fig. 8
C  M  Y  K 
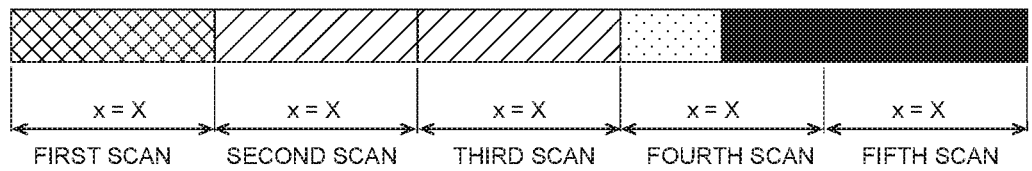

Fig. 10
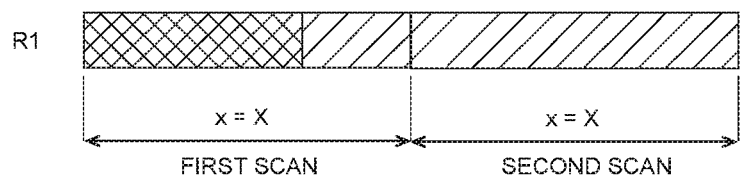
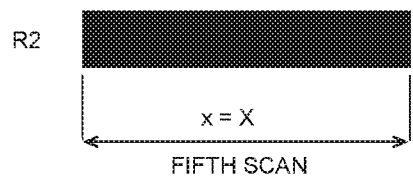

UNIDIRECTIONAL RECORDING (R1 = THREE SCANS, R2 = FIVE SCANS)

BIDIRECTIONAL RECORDING (R1 = THREE SCANS, R2 = FIVE SCANS)

LIQUID DISCHARGE APPARATUS, CONTROL METHOD FOR LIQUID DISCHARGE APPARATUS, AND MEDIUM STORING PROGRAM EXECUTABLE BY LIQUID DISCHARGE APPARATUS

CROSS REFERENCE TO RELATED APPLICATION

The present application claims priority from Japanese Patent Application No. 2019-139127 filed on Jul. 29, 2019, the disclosure of which is incorporated herein by reference in its entirety.

BACKGROUND

Field of the Invention

The present disclosure relates to a liquid discharge apparatus including a head configured to discharge a plurality of kinds of liquids, a control method for the liquid discharge apparatus, and a program executable by the liquid discharge apparatus.

Description of the Related Art

There is known a technique in which scanning of a head is performed a plurality of times for a unit area of a recording medium. In this technique, when image data corresponding to the unit area is allocated to multiple scans, each scan includes inks of all colors to be discharged from the head.

SUMMARY

In the above technique, since the inks of all colors are discharged in each scan, the inks (a plurality of kinds of liquids) are mixed on the recording medium, which may decrease chromaticness of an image.

An object of the present disclosure is to provide a liquid discharge apparatus, a control method for the liquid discharge apparatus, and a program executable by the liquid discharge apparatus those of which can inhibit a plurality of kinds of liquids from being mixed on a recording medium when discharge is divided into divided discharges and the divided discharges are performed for a unit area of the recording medium.

According to a first aspect of the present disclosure, there is provided a liquid discharge apparatus, including: ahead configured to discharge a plurality of colors of liquids; and a controller, wherein the controller is configured to: calculate a total discharge amount of the plurality of colors of liquids for a unit area of a recording medium based on discharge data for the unit area; determine whether the total discharge amount exceeds a predefined amount; in a case that the controller has determined that the total discharge amount exceeds the predefined amount, divide the discharge data into a plurality of pieces of divided discharge data, each of the pieces of divided discharge data indicating a total discharge amount which is not more than the predefined amount; and perform a plurality of divided discharges for the unit area based on the pieces of divided discharge data, wherein at least one of the plurality of colors of liquids is discharged from the head in one divided discharge included in the plurality of divided discharges, and the controller is configured to generate at least one of the plurality of pieces of divided discharge data in which at least one color of liquid is removed from the plurality of colors of liquids.

According to a second aspect of the present disclosure, there is provided a control method for controlling a liquid discharge apparatus provided with a head configured to discharge a plurality of colors of liquids, the method including: calculating a total discharge amount of the plurality of colors of liquids for a unit area of a recording medium based on discharge data for the unit area; determining whether the total discharge amount exceeds a predefined amount; in a case that the controller has determined that the total discharge amount exceeds the predefined amount, dividing the discharge data into a plurality of pieces of divided discharge data, each of the pieces of divided discharge data indicating a total discharge amount which is not more than the predefined amount; and performing a plurality of divided discharges for the unit area based on the pieces of divided discharge data, wherein at least one of the plurality of colors of liquids is discharged from the head in one divided discharge included in the plurality of divided discharges, and at least one of the plurality of pieces of divided discharge data in which at least one color of liquid is removed from the plurality of colors of liquids is generated.

According to a third aspect of the present disclosure, there is provided a non-transitory computer-readable medium storing a program that is executable by a controller of a liquid discharge apparatus that includes: a head configured to discharge a plurality of colors of liquids and a controller, the program, when executed by the controller, causing the liquid discharge apparatus to: calculate a total discharge amount of the plurality of colors of liquids for a unit area of a recording medium based on discharge data for the unit area; determine whether the total discharge amount exceeds a predefined amount, in a case that the controller has determined that the total discharge amount exceeds the predefined amount, divide the discharge data into a plurality of pieces of divided discharge data, each of the pieces of divided discharge data indicating a total discharge amount which is not more than the predefined amount, and perform a plurality of divided discharges for the unit area based on the plurality of pieces of divided discharge data, wherein at least one of the plurality of colors of liquids is discharged from the head in one divided discharge included in the plurality of divided discharges, and at least one of the plurality of pieces of divided discharge data in which at least one color of liquid is removed from the plurality of colors of liquids is generated.

According to the first to third aspects, when the divided discharges are performed for the unit area of the recording medium, at least one of the pieces of divided discharge data is configured by the discharge data related to the color of liquid in which at least one color of liquid is removed from the plurality of colors of liquids. This inhibits a problem in which the plurality of colors of liquids are mixed on the recording medium.

BRIEF DESCRIPTION OF THE DRAWINGS

FIGS. 5A and 5B are a flowchart indicating a process executed in a dividing step of FIG. 4.

FIG. 7 is a table for illustrating S21 to S23 of the dividing step.

FIG. 8 is a schematic diagram for illustrating S21 to S23 of the dividing step.

FIG. 10 schematically depicts an example in which discharge data for one of two unit areas is divided and discharge data for the other is not divided.

DESCRIPTION OF THE EMBODIMENTS

Figure 1:
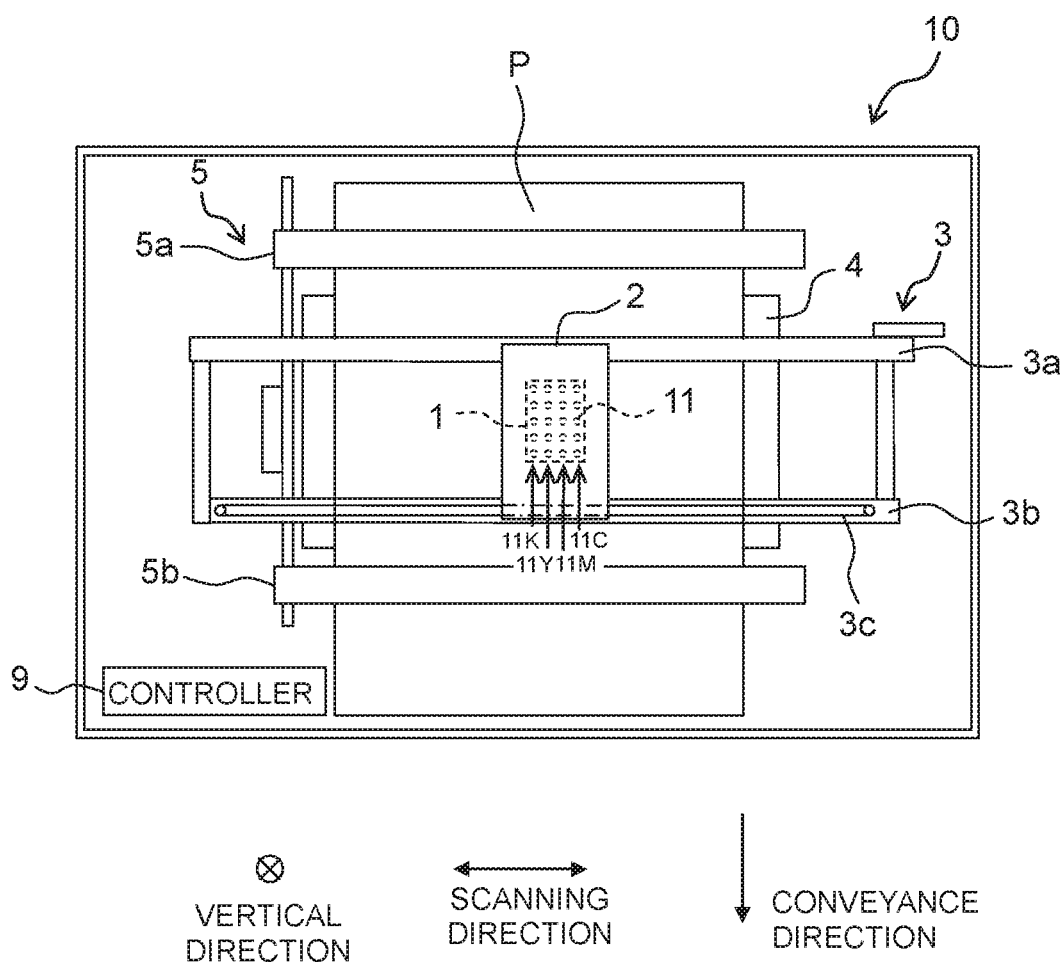
FIG. 1 is a plan view of a printer according to an embodiment of the present disclosure.

As depicted in FIG. 1, a printer 10 according to an embodiment of the present disclosure includes a head 1, a carriage 2 carrying the head 1, a movement mechanism 3 that moves the carriage 2 in a scanning direction (direction orthogonal to a vertical direction), a platen 4 supporting a sheet P from below, a conveyance mechanism 5 that conveys the sheet P in a conveyance direction (direction orthogonal to the scanning direction and the vertical direction), and a controller 9. Nozzles 11a are formed in a lower surface of the head 1.

Figure 2:
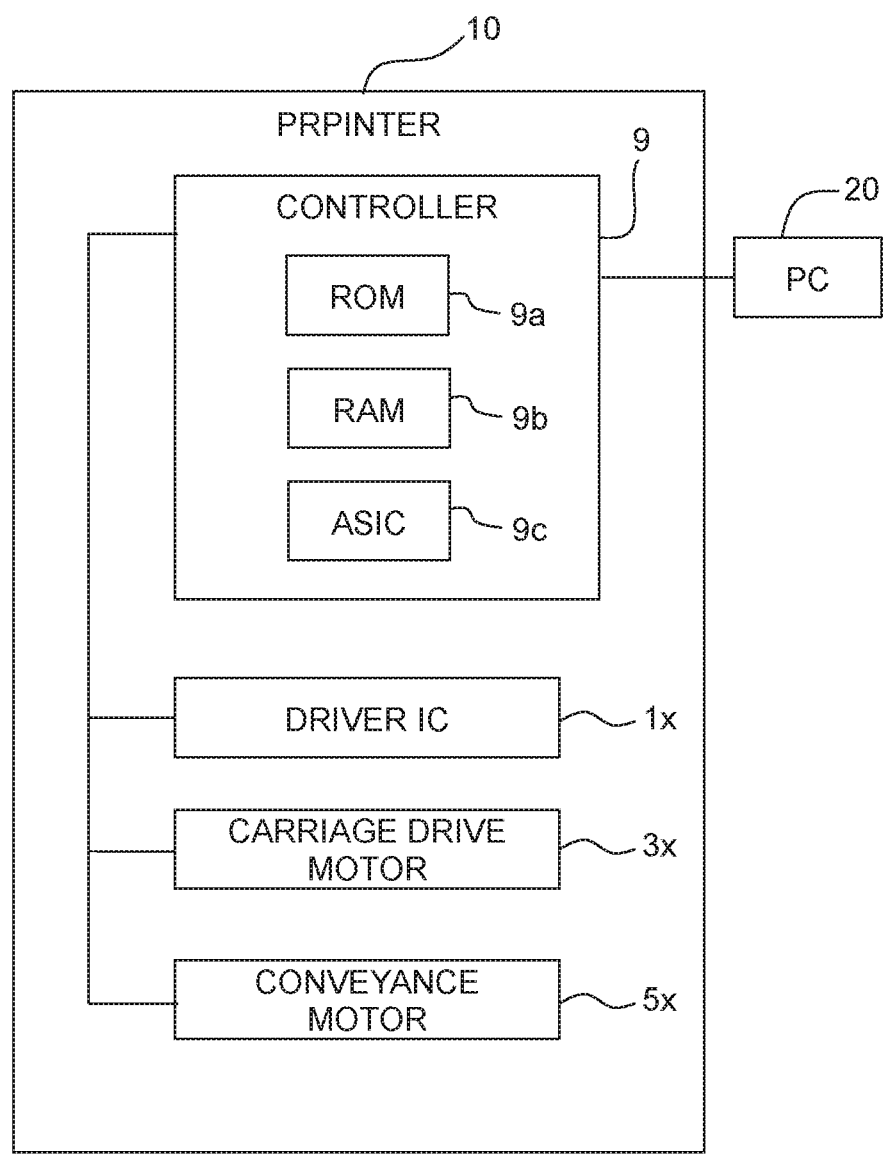
FIG. 2 is a block diagram of an electrical configuration of the printer in FIG. 1.

Inks are discharged from the nozzles 11 by causing the controller 9 to control a driver IC1x (see FIG. 2).

The nozzles 11 form four nozzle rows 11C, 11M, 1Y, and 11K arranged in the scanning direction. Each of the nozzle rows 11C, 11M, 11Y, and 11K is formed by the nozzles 11 arranged in the conveyance direction. A cyan ink is discharged from the nozzles 11 belonging to the nozzle row 11C, a magenta ink is discharged from the nozzles 11 belonging to the nozzle row 11M, a yellow ink is discharged from the nozzles 11 belonging to the nozzle row 11Y, and a black ink is discharged from the nozzles 11 belonging to the nozzle row 11K. Namely, the head 1 discharges a plurality of kinds of inks (in this embodiment, four colors of CMYK (C is cyan, M is magenta. Y is yellow. K is black)). Two of the CMYK correspond to a "first kind" and a "second kind" of the present disclosure.

The movement mechanism 3 includes a pair of guides 3a, 3b supporting the carriage 2, and a belt 3c coupled to the carriage 2. The guides 3a, 3b and the belt 3c extend in the scanning direction. When the controller 9 controls and drives a carriage drive motor 3x (see FIG. 2), the belt 3c runs and the carriage 2 moves in the scanning direction along the guides 3a. 3b.

The platen 4 is disposed below the carriage 2 and the head 1. The sheet P is placed on an upper surface of the platen 4.

The conveyor 5 includes two roller pairs 5a, 5b. The head 1, the carriage 2, and the platen 4 are placed between the roller pair 5a and the roller pair 5b in the conveyance direction. When the controller 9 controls and drives a conveyance motor 5x (see FIG. 2), the roller pairs 5a, 5b nipping the sheet P rotate, and the sheet P is conveyed in the conveyance direction.

As depicted in FIG. 2, the controller 9 includes a Read Only Memory (ROM) 9a, a Random Access Memory (RAM) 9b, and an Application Specific Integrated Circuit (ASIC) 9c. Programs and data for allowing the ASIC 9c to control a variety of operations are stored in the ROM 9a. The RAM 9b temporarily saves data that is used for execution of the programs by the ASIC 9c. The ASIC 9c executes a recording process and the like in accordance with the programs and data stored and saved in the ROM 9a and the RAM 9b based on data input from an external apparatus (a PC 20 or the like depicted in FIG. 2).

Figure 3:
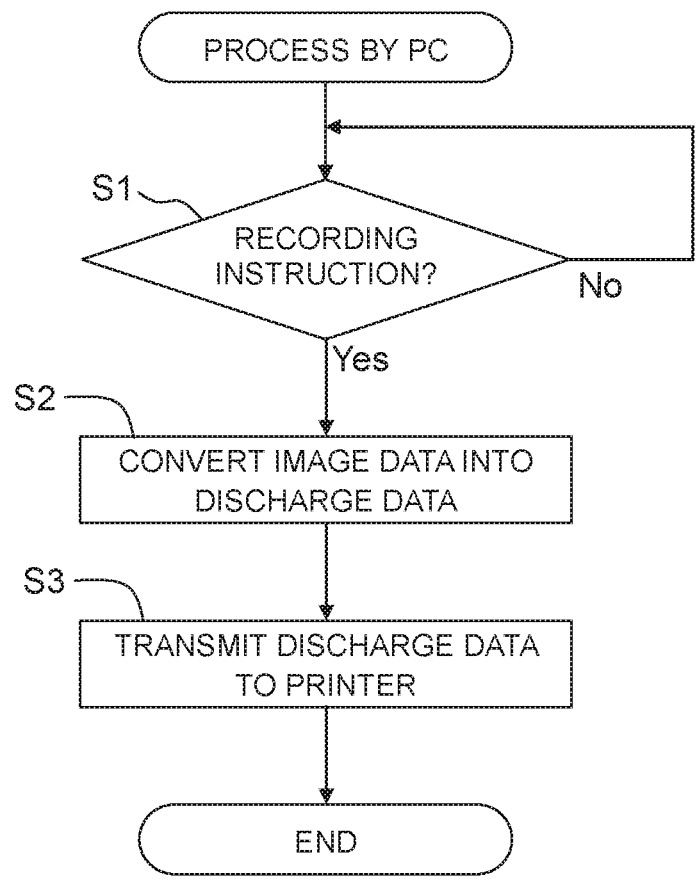
FIG. 3 is a flowchart indicating a process executed by a PC that is electrically connected to the printer in FIG. 1.
Figure 4:
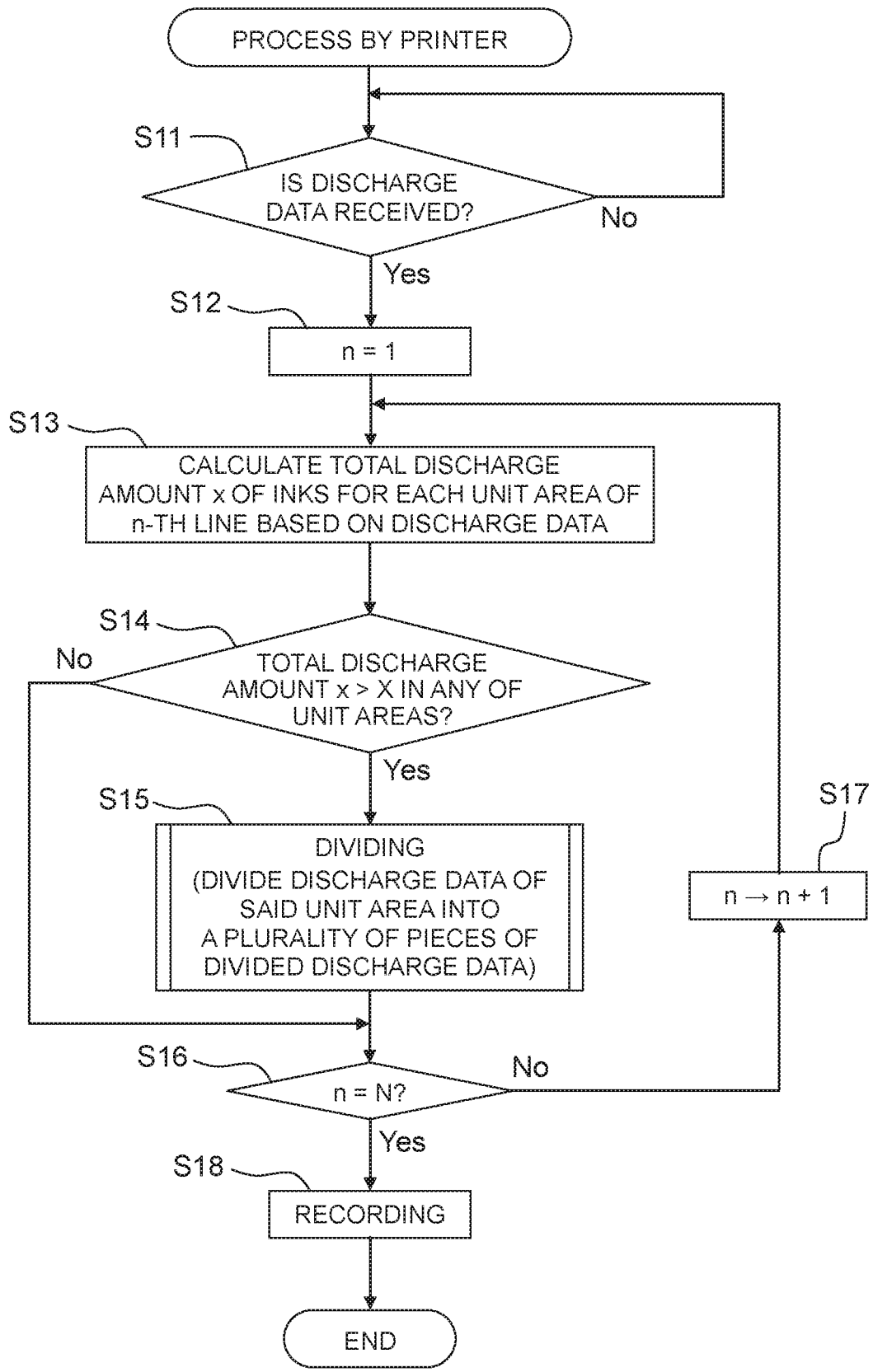
FIG. 4 is a flowchart indicating a process executed by the printer in FIG. 1.

Referring to FIGS. 3 to 5, the recording process is described below.

In this embodiment, a process by the PC 20 is executed first as indicated in FIG. 3, and then a process by the printer 10 is executed as indicated in FIG. 4. The controller 9 executes the process in FIG. 4.

As indicated in FIG. 3, the PC 20 first determines whether there is a recording instruction (S1). For example, a user performs the recording instruction by operating an inputting means (a keyboard or a mouse) of the PC 20.

When the recording instruction is not performed (S1: NO), the PC 20 repeats a step of S1.

When the recording instruction is performed (S1: YES), the PC 20 converts image data included in the recoding instruction (data of RGB (red, green, blue) corresponding to a color(s) of an image) into discharge data (data of CMYK corresponding to colors of inks) (S22). The discharge data indicates a volume (any of a large droplet, a medium droplet, a small droplet, and zero) of one of the inks to be discharged from each nozzle 11 for one recording cycle (a time required for relative movement of the sheet P with respect to the head 1 by a unit distance corresponding to a resolution of the image to be formed on the sheet P).

After S2, the PC20 transmits the discharge data obtained in S2 to the controller 9 of the printer 10 (S3).

As indicated in FIG. 4, the controller 9 first determines whether the controller 9 has received the discharge data (S11).

When the controller 9 has not received the discharge data (S11: NO), the controller 9 repeats the step of S11.

When the controller 9 has received the discharge data (S11: YES), the controller 9 sets n to one (S12).

After S12, the controller 9 calculates, based on the discharge data, a total discharge amount x of inks for each of a first unit area R1 and a second unit area R2 (see FIG. 6) of a n-th line (S13: calculation step).

Figure 6:
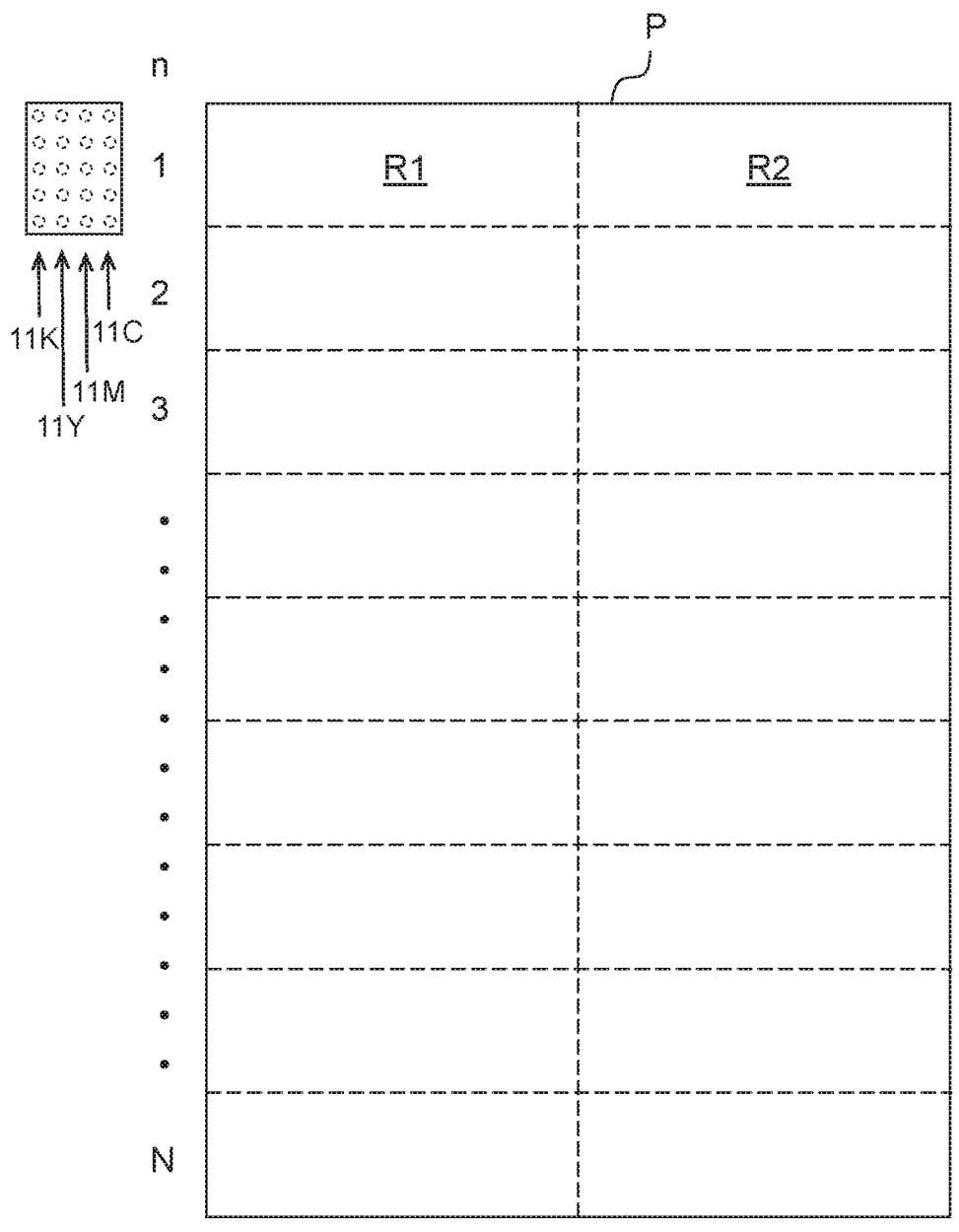
FIG. 6 schematically depicts n-th lines (n=1 to N) and unit areas.

As depicted in FIG. 6, the unit areas R1 and R2 are formed by dividing an entire area on the sheet P into the unit areas R1 and R2. In this embodiment, the two unit areas R1 and R2 arranged in the scanning direction are set for each of the n-th lines (n=1 to N). Namely, the unit area R2 is arranged side by side with the unit area R1 in the scanning direction.

The controller 9 controls the driver IC 1x, the carriage drive motor 3x, and the conveyance motor 5x to alternately execute a conveyance operation and a scanning operation (hereinafter simply referred to as "scan" in some cases). In the conveyance operation, the conveyance mechanism 5 conveys the sheet P in the conveyance direction by a predefined amount. In the scanning operation, ink(s) is/are discharged from the nozzles 11 during the movement of the carriage 2 in the scanning direction. This forms ink dots on the sheet P, thereby recording an image.

The n (=1 to N)-th line is an area on the sheet P where the movement mechanism 3 causes the carriage 2 to reciprocate in the scanning direction. A length in the scanning direction of an area of the n-th line is no longer than a length in the scanning direction of movable area for the carriage 2. The length in the scanning direction of each of the unit areas R1 and R2 is a half of the length in the scanning direction of an area of the n-th line (i.e., not more than the length in the scanning direction of the area of the n-th line).

After the scanning operation is performed for the n-th line (<N), the conveyance operation is performed. Then, the scanning operation is performed for the (n+1)-th line.

In this embodiment, a "unidirectional recording (one-way recording)" is performed. In the unidirectional recording, ink(s) is/are discharged from the nozzles 11 when the carriage 2 moves through an going route in the scanning direction (rightward movement in FIGS. 1 and 6) and no ink is discharged from the nozzles 11 when the carriage 2 moves through a returning route in the scanning direction (leftward movement in FIGS. 1 and 6).

The total discharge amount x calculated in the calculation step (S13) is an amount of inks (a total of the amounts of inks of the respective colors (CMYK)) discharged from the nozzles 11 for each of the unit areas R1 and R2 during movement of the carriage 2 through the going route.

After the calculation step (S13), the controller 9 determines whether the total discharge amount x exceeds a predefined amount X in at least any of the unit areas R1 and R2 (S14: determination step).

When the total discharge amount x does not exceed the predefined amount X in both of the unit areas R and R2 (S14: NO), the controller 9 proceeds to S16.

When the total discharge amount x exceeds the predefined amount X in at least any of the unit areas R1 and R2 (S14: YES), the controller 9 divides the discharge data for the unit areas R1 and/or R2, that has/have been determined that the total discharge amount x exceeds the predefined amount X, into a plurality of pieces of divided discharge data (S15: dividing step). The discharge amount of each piece of divided discharge data is equal to or less than the predefined amount X.

When the controller 9 has determined that the total discharge amount x exceeds the predefined amount X in both of the unit areas R1 and R2, the controller 9 executes the dividing step (S15) for each of the two unit areas R1 and R2. When the controller 9 has determined that the total discharge amount x exceeds the predefined amount X in one of the unit areas R1 and R2, the controller 9 executes the dividing step (S15) for the one of the unit areas, and does not execute the dividing step (S15) for the other.

Figure 5A:
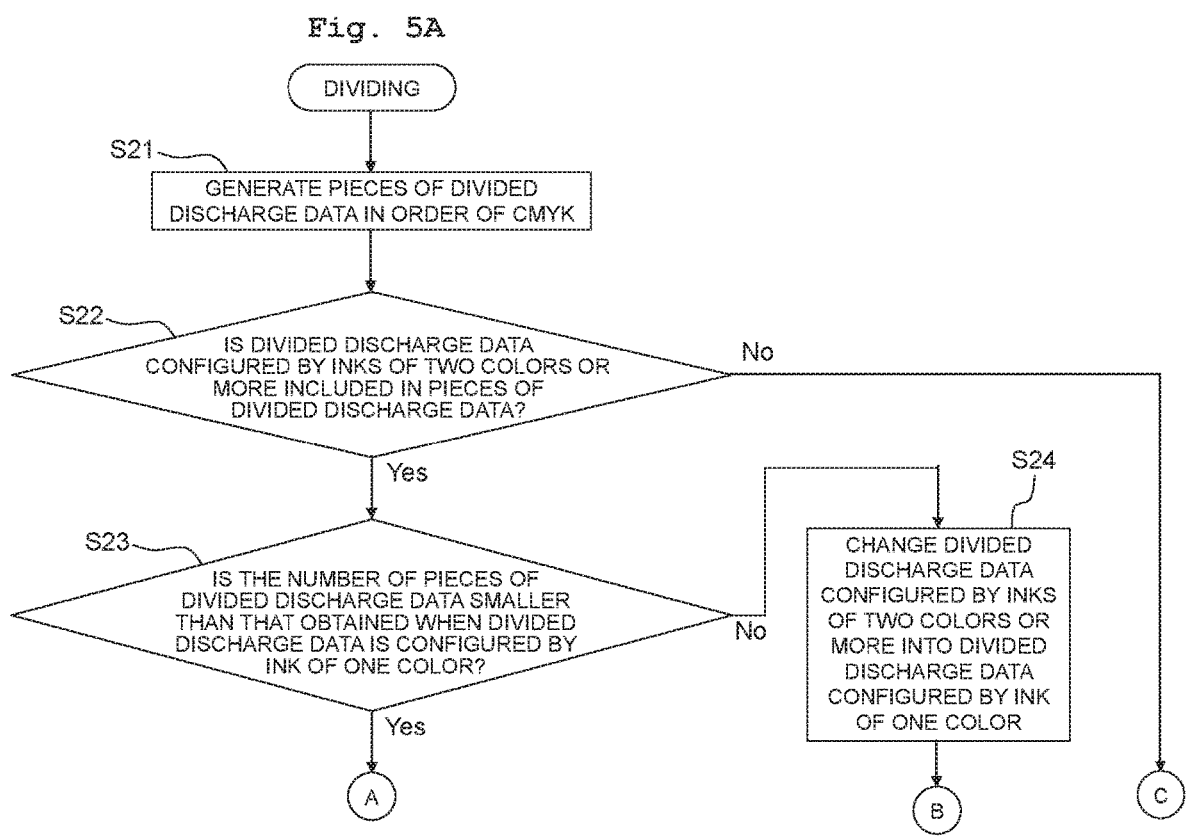

In the dividing step (S15), as indicated in FIGS. 5A and 5B, the controller 9 generates the pieces of divided discharge data of which total discharge amounts x are the predefined amount X, in the order of CMYK (i.e., in order starting from the color corresponding to the nozzle row (nozzle row 11C in this embodiment) disposed at the most downstream side in the going route (rightward direction in FIG. 6) in the scanning direction) (S21).

For example, as indicated in FIG. 7, it is assumed that the total discharge amount x calculated in the calculation step (S13) is 75 pl (=discharge amounts 20 pl of the inks of respective colors of CMY+the discharge amount 15 pl of the ink K) and that the total discharge amount x exceeds the predefined amount X (15 pl). In this case, the controller 9 generates in S21 the pieces of divided discharge data for the m-th scan (m is a natural number equal to or more than one) in the order of CMYK so that the total discharge amount x is the predefined amount X (15 pl). In the example of FIG. 7, five pieces of divided discharge data for the m-th scan (m=1 to 5) are generated, and the carriage 2 reciprocates in the scanning direction five times for the n-th line. The total discharge amount x for the first scan is 15 pl of the ink C (=predefined amount X: 15 pl), the total discharge amount x for the second scan is 5 pl of the ink C+10 pl of the ink M (=predefined amount X: 15 pl), the total discharge amount x for the third scan is 10 pl of the ink M+5 pl of the ink Y (=predefined amount X: 15 pl), the total discharge amount x for the fourth scan is 15 pl of the ink Y (=predefined amount X: 15 pl), and the total discharge amount x for the fifth scan is 15 pl of the ink K (=predefined amount X: 15 pl).

Similar to the case of FIG. 7, in an example depicted in FIG. 8, the total discharge amount calculated in the calculation step (S13) is 5× (five times the predefined amount X) and five pieces of divided discharge data for the m-th scan (m=1 to 5) are generated. Then, the carriage 2 reciprocates five times in the scanning direction for the n-th line. However, the ink C in the predefined amount X is discharged in the first scan, and the ink M in the predefined amount X is discharged in the second scan and the third scan. In the fourth scan, the ink M in half of the predefined amount X and the ink K in half of the predefined amount X are discharged. In the fifth scan, the ink K in the predefined amount X is discharged.

As described above, each piece of divided discharge data generated in S21 is configured by ink(s) of one color or two colors (in which at least one color is removed from the four colors of CMYK).

After S21, the controller 9 determines whether the pieces of divided discharge data generated in S21 include the divided discharge data configured by inks of two colors or more (S22).

When the divided discharge data configured by the inks of two colors or more is not included (S22: NO), the controller 9 ends this routine.

When the divided discharge data configured by the inks of two colors or more is included (S22: YES), the controller 9 determines whether the number of pieces of divided discharge data obtained when the divided discharge data is configured by the ink of two colors or more is smaller than the number of pieces of divided discharge data obtained when the divided discharge data is configured by an ink of one color (S23).

In the example of FIG. 7, the pieces of divided discharge data configured by inks of two colors are allocated to the second scan and the third scan. When the divided discharge data for the second scan is configured only by the ink C, the divided discharge data of the ink M (10 pl) allocated to the second scan is allocated to the third scan. In this case, 15 pl of the ink M is allocated to the third scan, and the rest of ink M (5 pl) is allocated to the fourth scan. Further, since the pieces of discharge data for the inks Y and K are allocated to the scan(s) after the fifth scan, the number of pieces of divided discharge data is larger than the number of pieces of divided discharge data (=5) generated in S21. Namely, the number of times of reciprocating movement (reciprocating movement count) in the scanning direction of the carriage 2 for the n-th line is greater than five.

In the example of FIG. 8, the divided discharge data configured by inks of two colors is allocated to the fourth scan. When the divided discharge data for the fourth scan is configured only by the ink Y, the discharge data of the ink K (X/2) allocated to the fourth scan is allocated to the fifth scan. In this case, the predefined amount X of ink K is allocated to the fifth scan, and the discharge data for the rest of ink K (X/2) is allocated to the sixth scan. As a result, the number of pieces of divided discharge data is larger than the number of pieces of divided discharge data (=5) generated in S21. Namely, the reciprocating movement count in the scanning direction of the carriage 2 for the n-th line is greater than five.

Thus, in the examples of FIGS. 7 and 8, the number of pieces of divided discharge data obtained when the divided discharge data is configured by inks of two colors or more is smaller than that obtained when the divided discharge data is configured by an ink of one color.

If the number of pieces of divided discharge data obtained when the divided discharge data is configured by inks of two colors or more is smaller than that obtained when the divided discharge data is configured by the ink of one color (S23: YES), the controller 9 maintains the piece(s) of divided discharge data configured by the inks of two colors or more and proceeds to a step S25.

When the number of pieces of divided discharge data obtained when the divided discharge data is configured by inks of two colors or more is equal to or larger than that obtained when the divided discharge data is configured by the ink of one color (S23: NO), the controller 9 changes the divided discharge data configured by the inks of two colors or more into the divided discharge data configured by the ink of one color (S24). After the step S24, the controller 9 ends this routine.

In the S25, the controller 9 determines whether the total discharge amount x indicated by the last divided discharge data is less than the predefined amount X. In this embodiment, the last divided discharge data means divided discharge data allocated to the last scan (the fifth scan in an example of FIG. 9A) for the n-th line.

When the total discharge amount x indicated by the last divided discharge data is equal to or more than the predefined amount X (S25: NO), the controller 9 ends this routine.

When the total discharge amount x indicated by the last divided discharge data is less than the predefined amount X (S25: YES), the controller 9 performs the following determination. Namely, the controller 9 determines whether the number of pieces of divided discharge data increases when a part of configuration of the divided discharge data configured by inks of two colors or more is moved into the last divided discharge data. Specifically, the controller 9 determines whether the number of pieces of divided discharge data increases when the discharge data related to an ink having any of the colors is moved to divided discharge data next to the divided discharge data (S26).

Figure 9A:
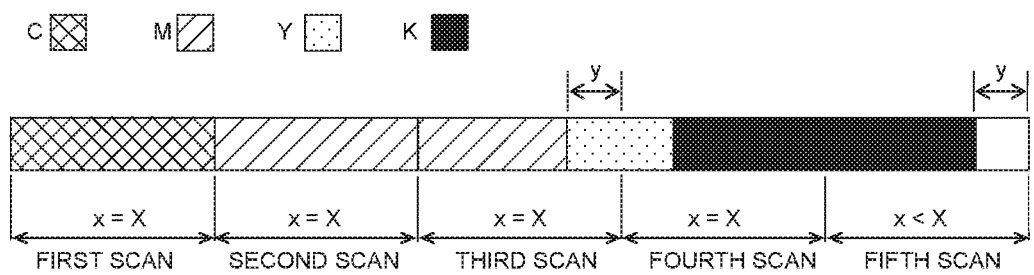
FIGS. 9A and 9B are schematic diagrams for illustrating S25 to S27 of the dividing step.

In the example of FIG. 9A, the total discharge amount x indicated by the last divided discharge data (divided discharge data allocated to the fifth scan) is less than the predefined amount X, which is (X−y). The ink M and ink Y are allocated to the third scan (divided discharge data is configured by inks of two colors or more), and the discharge amount of the ink Y is y. In that case for example, when the discharge data related to the ink Y allocated to the third scan (discharge data related to an ink having any of the colors) is moved to the fourth scan (divided discharge data next to the divided discharge data), the pieces of divided discharge data are allocated to the respective scans as depicted in FIG. 9B.

Figure 9B:
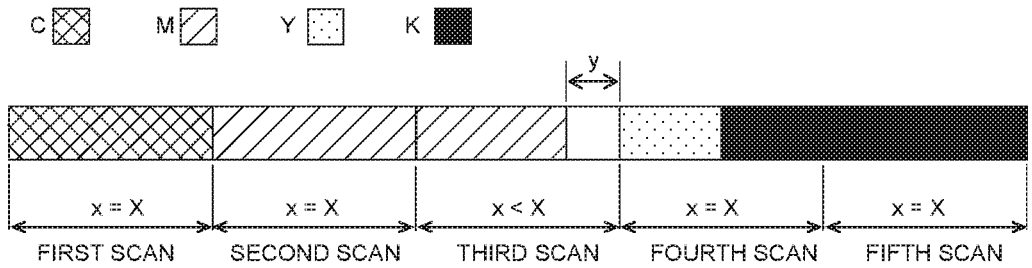

In the example of FIG. 9B, the divided discharge data configured by the ink M (an ink of one color) is allocated to the third scan, and the total discharge amount x indicated by the divided discharge data is less than the predefined amount X which is (X−y). The total discharge amount x indicated by the divided discharge data allocated to the fifth scan is the predefined amount X. The number of pieces of divided discharge data is the same as that in FIG. 9A, which is five.

Thus, in the examples of FIGS. 9A and 9B, when the configuration of the divided discharge data configured by inks of two colors or more is changed, the number of pieces of divided discharge data does not increase.

When the number of pieces of divided discharge data increases (S26: YES), the controller 9 ends this routine.

When the number of pieces of divided discharge data does not increase (S26: NO), the controller 9 changes the configuration of the divided discharge data configured by inks of two colors or more. Specifically, the discharge data related to an ink having any of the colors is moved to divided discharge data next to the divided discharge data (S27). For example, the configuration of the divided discharge data is changed from the configuration depicted in FIG. 9A to the configuration depicted in FIG. 9B.

After the step S27, the controller 9 ends this routine.

After executing the dividing step (S15) as described above, the controller 9 determines whether n=N (the last line) is satisfied, as indicated in FIG. 4.

When n=N is not satisfied (S16: NO), the controller 9 changes n to n+1 (S17), and returns to the calculation step (S13).

When n=N is satisfied (S16: YES), the controller 9 controls the driver IC 1x, the carriage drive motor 3x, and the conveyance motor 5x to execute the recording process (discharge step: S18).

In the discharge step (S18), the controller 9 executes the recording process in the order starting from the first line. When the unit areas R1 and/or R2 subjected to the dividing step (S15) is/are included in each line, the controller 9 executes divided discharge (the scanning operation in this embodiment) a plurality of times in which ink is discharged from the nozzles 11 based on the pieces of divided discharge data generated in the dividing step (S15). For the unit areas R1 and/or R2 not subjected to the dividing step (S15), the controller 9 executes ink discharge from the nozzles 11 based on the discharge data received in the step S11.

Namely, when the dividing step (S15) is not executed, discharge is executed for the unit areas R1 and R2 during one scan. In the examples in FIGS. 7 to 9B, the discharge for the unit areas R1 and R2 is executed by five scans. In an example of FIG. 10, the discharge for the unit areas R1 and R2 is executed by two scans.

In an example of FIG. 10, the total discharge amount x for the unit area R1 exceeds the predefined amount X and the total discharge amount x for the unit area R2 does not exceed the predefined amount X. In that case, the discharge data for the unit area R1 is divided (is subjected to the dividing step (S15)) and the discharge data for the unit area R2 is not divided (is not subjected to the dividing step (S15)). In this example, the ink C and the ink M are discharged for the unit area R1 in the first scan (the total discharge amount x=the predefined amount X), and the ink K is discharged for the unit area R2 (the total discharge amount x=the predefined amount X). In the second scan, although the ink M is discharged for the unit area R1 (the total discharge amount x=the predefined amount X), no ink is discharged for the unit area R2.

Figure 11A:
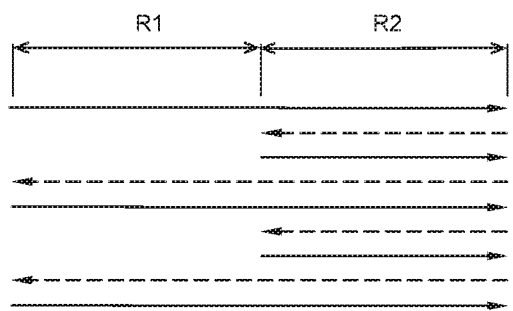
FIGS. 11A and 11B schematically depict exemplary movement configurations of a carriage.

FIG. 11A depicts an exemplary movement configuration of the carriage 2 when three scans are executed for the unit area R1 and five scans are executed for the unit area R2. FIG. 11A is an example on the assumption that "unidirectional recording (one-way recording)" is performed as in this embodiment. In FIG. 11A, solid lines indicate the scanning operation (the operation in which ink is discharged from the nozzles 11 during the movement of the carriage 2 through the going route in the scanning direction). Broken lines indicate an operation in which no ink is discharged from the nozzles 11 during the movement of the carriage 2 through the returning route in the scanning direction. In this example, the first scan for the unit areas R1 and R2 (the solid line arrow at the uppermost side) is performed by moving the carriage 2 through the going route in the unit areas R1 and R2. Next, the carriages 2 moves through the returning route (the broken line arrow at the second uppermost side) in the unit area R2. Next, the second scan for the unit area R2 (the solid line arrow at the third uppermost side) is performed by moving the carriage 2 through the going route in the unit area R2. Next, the carriage 2 moves through the returning route (the broken line arrow at the fourth uppermost side) in the unit areas R1 and R2. Next, the second scan for the unit area R1 and the third scan for the unit area R2 (the solid line arrow at the fifth uppermost side) are performed by moving the carriage 2 through the going route in the unit areas R1 and R2. Next, the carriage 2 moves through the returning route in the unit area R2 (the broken line arrow at the sixth uppermost side). Next, the fourth scan for the unit area R2 (the solid line arrow at the seventh uppermost side) is performed by moving the carriage 2 through the going route in the unit area R2. After that, the carriage 2 moves through the returning route in the unit areas R1 and R2 (the broken line arrow at the eight uppermost side). Then, the third scan for the unit area R1 and the fifth scan for the unit area R2 (the solid line arrow at the lowermost side) are performed by moving the carriage 2 through the going route in the unit areas R1 and R2. Accordingly, recording of the lines provided with the unit areas R1 and R2 is completed.

Figure 11B:
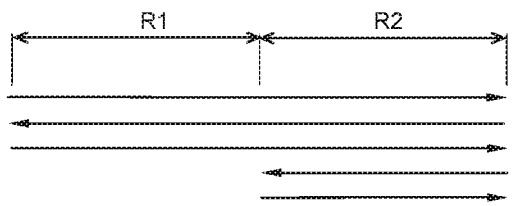

FIG. 11B depicts an exemplary movement configuration of the carriage 2 when three scans are executed for the unit area R1 and five scans are executed for the unit area R2. Unlike the "unidirectional recording" of this embodiment, FIG. 11B is an example on the assumed that "bidirectional recording (two-way recording)" is performed. In the bidirectional recording, ink is discharged from the nozzles 11 when the carriage 2 moves through each of the going route and the returning route in the scanning direction. Solid lines indicate the scanning operation (the operation in which ink is discharged from the nozzles 11 while the carriage 2 moves through the going route or the returning route in the scanning direction). In this example, the first scan for the unit areas R1 and R2 is performed (the solid line arrow at the uppermost side) by moving the carriage 2 through the going route in the unit areas R1 and R2. Next, the second scan for the unit areas R and R2 is performed (the solid line arrow at the second uppermost side) by moving the carriage 2 through the returning route in the unit areas R1 and R2. Next, the third scan for the unit areas R1 and R2 is performed (the solid line arrow at the third uppermost side) by moving the carriage 2 through the going route in the unit areas R1 and R2. Next, the fourth scan for the unit area R2 is performed (the solid line arrow at the fourth uppermost side) by moving the carriage 2 through the returning route in the unit area R2. The fifth scan for the unit area R2 is performed (the solid line arrow at the fifth uppermost side) by moving the carriage 2 through the returning route in the unit area R2. Accordingly, recording for the lines provided with the unit areas R1 and R2 is completed.

Since the pieces of divided discharge data are generated in the order of CMYK in S21 of the dividing step, divided discharges are performed in the order of CMYK in the discharge step (S18).

In the discharge step (S18), after divided discharge using a first color ink is performed, divided discharge using a second color ink, which is different from the first color ink, may be performed twice or more (such as the example of FIG. 8 in which the ink C is discharged in the first scan, and then the ink M is discharged in the second scan and the third scan) without using the conveyance mechanism 5. In this case, the following control is performed. Namely, in the first divided discharge (the second scan in FIG. 8) from among the divided discharges performed continuously twice or more, the controller 9 discharges the second color ink at a position that is included in any of the unit areas R1 and R2 and from which a position subjected to the divided discharge using the first color ink (in FIG. 8, the position where the ink C is discharged in the first scan) is removed. The data related to the discharge position is included in the pieces of divided discharge data generated in the dividing step (S15).

After the discharge step (S18), the controller 9 ends this routine.

In this embodiment, the ASIC 9c executes the calculation step (S13), the determination step (S14), the dividing step (S15), and the discharge step (S18) in accordance with the program(s) stored in the ROM 9a.

As described above, in this embodiment, when ink discharge is divided and the divided ink discharges are performed for the unit areas R1 and R2 of the sheet P, at least one of the pieces of divided discharge data is configured by ink(s) in which at least one color is removed from the four colors of CMYK (see FIGS. 7 to 10). This inhibits inks having different colors from being mixed on the sheet P.

Ink is quickly dried on the sheet P by making the total discharge amount x for each divided discharge (each scan in this embodiment) equal to less than the predefined amount X. Then, by making ink land on the dried ink in the next divided discharge, ink stays on a surface of the sheet P and color gamut improves.

In the discharge step (S18), after the divided discharge using the first color ink is performed, the divided discharge using the second color ink, which is different from the first color ink, may be continuously performed twice or more (such as the example of FIG. 8 in which the ink C is discharged in the first scan, and then the ink M is discharged in the second scan and the third scan). In this case, the controller performs the following control. Namely, in the first divided discharge (in FIG. 8, the second scan) from among the divided discharges performed continuously twice or more, the controller 9 discharges the second color ink at the position that is included in any of the unit areas R1 and R2 and from which the position subjected to the divided discharge using the first color ink (in FIG. 8, the position where the ink C is discharged in the first scan) is removed. In this case, inks having different colors are reliably inhibited from being mixed on the sheet P.

When at least one of the pieces of divided discharge data is configured by inks of two colors or more in the dividing step (S15), the controller 9 determines whether the number of pieces of divided discharge data is smaller than the case in which at least one of the pieces of divided discharge data is configured by an ink of one color (S23). When the number of pieces of divided discharge data is smaller than the case in which at least one of the pieces of divided discharge data is configured by the ink of one color (S23: YES), the controller 9 configures the divided discharge data by the inks of two colors or more. This inhibits the increase in a divided discharge count (the number of times of divided discharge), and consequently inhibiting the decrease in recording velocity.

In the dividing step (S15), when the controller 9 sequentially generates the pieces of divided discharge data of which total discharge amounts x are the predefined amount X (S21), and when the total discharge amount x indicated by the last divided discharge data is less than the predefined amount X (S25: YES), the controller 9 performs the following control. Namely, the controller 9 determines whether the number of pieces of divided discharge data increases when discharge data that is included in the divided discharge data configured by inks of two colors or more and that is related to any of the colors is moved to divided discharge data next to the divided discharge data (S26). When the number of pieces of divided discharge data does not increase (S26: NO), the controller 9 moves the discharge data that is included in the divided discharge data configured by the inks of two colors or more and that is related to any of the colors to the divided discharge data next to the divided discharge data (S27). This reduces the kinds of ink colors configuring the divided discharge data that is a moving source, which reliably inhibits inks having different colors from being mixed on the sheet P.

The length in the scanning direction of the unit area R1 and the length in the scanning direction of the unit area R2 are equal to or less than the length in the scanning direction of the area where the movement mechanism 3 moves the carriage 2 in the scanning direction (see FIG. 6). In this case, the present disclosure is applicable to a serial-type liquid discharge apparatus, and it is possible to inhibit inks having different colors from being mixed on the sheet P for each scan.

In the discharge step (S18), the controller 9 executes the divided discharges (see FIGS. 7 to 9) in the order of CMYK (i.e., in order starting from the color corresponding to the nozzle row (nozzle row 11C in this embodiment) disposed at the most downstream side in the going route (rightward direction in FIG. 6) in the scanning direction). On the other hand, when the discharge data is not divided, inks are sequentially discharged in order starting from the color corresponding to the nozzle row disposed at the most downstream side in the going route in the scanning direction. In the above configuration, since the discharge order of ink colors when the discharge data is divided is the same as that when the discharge data is not divided, the change in color gamut and the like can be inhibited which may otherwise be caused by the divided discharge.

The "unidirectional recording" is performed in the above embodiment. When the "bidirectional recording" is performed (see FIG. 11B), the pieces of divided discharge data include data for the going route and data for the returning route. In that case, the present disclosure is appliable to the bidirectional recording.

The predefined amount X in the "bidirectional recording" is set to a value larger than the predefined amount X in the "unidirectional recording". In the "bidirectional recording", a timing at which ink is discharged in the movement through the going route is different from a timing at which ink is discharged in the movement through the returning route. Namely, a time difference is caused between those timings. Thus, in the "bidirectional recording", even when the ink discharge amount is larger than that of the "unidirectional recording", inks having different colors are less likely to be mixed, and it is possible to increase the ink discharge amount (predefined amount) allowed for one reciprocating movement. Accordingly, the reciprocating movement count can be reduced and the recording velocity can be increased by setting the predefined amount X for the "bidirectional recording" to a large value.

Modified Examples

The embodiment of the present disclosure is explained above. The present disclosure, however, is not limited to the above embodiment. Various changes or modifications in the design may be made without departing from the claims.

For example, in the above embodiment, the controller 9 sequentially generates the pieces of divided discharge data (S21) in order of CMYK (i.e., in order starting from the color corresponding to the nozzle row (nozzle row 11C in this embodiment) disposed at the most downstream side in the going route (rightward direction in FIG. 6) in the scanning direction), and the controller 9 executes the divided discharges (S18). The present disclosure, however, is not limited thereto. The sequential order of the plurality of kinds of liquids used for generating the pieces of divided discharge data may not be limited, and the pieces of divided discharge data may be generated in any order.

In the above embodiment, each piece of divided discharge data generated in S21 is configured by an ink of one color or inks of two colors. Each piece of divided discharge data, however, may be configured by ink(s) in which at least one color is removed from the four colors of CMYK. Each piece of divided discharge data may be configured by inks of three colors.

In the dividing step, it is only necessary to configure at least one of the pieces of divided discharge data by the discharge data related to a liquid included in the plurality of kinds and in which at least one kind is removed from the plurality of kinds.

In the above embodiment, each line is formed by the two unit areas R1 and R2. The present disclosure, however, is not limited thereto. For example, each line may be formed by three or more of unit areas, or each line may be formed by one unit area.

In the above embodiment, the controller divides the discharge data into the pieces of divided discharge data only for the unit area that has determined that the total discharge amount exceeds the predefined amount. The present disclosure, however, is not limited thereto. For example, the controller may divide the discharge data into the pieces of divided discharge data not only for the unit area that has been determined that the total discharge amount exceeds the predefined amount, but also for an unit area that has determined that the total discharge amount does not exceed the predefined amount.

In the above embodiment, when at least one of the pieces of divided discharge data is configured by inks of "two colors" or more, the controller determines whether the number of pieces of divided discharge data is smaller than the case in which at least one of the pieces of divided discharge data is configured by an ink of one color (S23). The present disclosure, however, is not limited thereto. For example, when at least one of the pieces of divided discharge data is configured by inks of "three colors" or more, the controller may determine whether the number pieces of divided discharge data is smaller than the case in which at least one of the pieces of divided discharge data is configured by inks of "two colors". When the number of pieces of divided data is smaller than the case in which at least one of the pieces of divided discharge data is configured by the inks of "two colors", the controller may configure the divided discharge data by the inks of "three colors" or more.

In the examples in FIGS. 9A and 9B, the discharge data related to the ink Y allocated to the third scan is moved to the fourth scan. This discharge data, however, may be moved to the fifth scan. Namely, when a certain piece of divided discharge data is configured by discharge data related to liquids of two kinds or more, discharge data related to any kind of liquid from among the liquids of two kinds or more may be moved to any piece of divided discharge data after the divided discharge data. A move destination thereof is not limited to the divided discharge data "immediately after" the divided discharge data.

The serial-type head is used in the above embodiment. However, a line-type head may be used. When using the line-type head, a discharge operation may be divided, and the divided discharge operations may be performed at intervals, as the divided discharges in the discharge step.

As the kinds of liquids, "ink colors" are exemplified in the above embodiment. The present disclosure, however, is not limited thereto. For example, the head may discharge an ink and a different kind of liquid, which is any other liquid than the ink (e.g., a treatment liquid that agglutinates or precipitates constituents of ink).

The recording medium is not limited to the sheet and paper. The recording medium may be, for example, cloth, a resin member, and the like.

The present disclosure is applicable to facsimiles, copy machines, multifunction peripherals, and the like without limited to printers. The present disclosure is also applicable to a liquid discharge apparatus used for any other application than the image recording (e.g., a liquid discharge apparatus that forms an electroconductive pattern by discharging an electroconductive liquid on a substrate).

The program according to the present disclosure is distributable, for example, via communication lines or by being recorded on a removable-type recording medium such as a flexible disk and a non-removable type recording medium such as a hard disk.

What is claimed is:

1. A liquid discharge apparatus, comprising:
   a head configured to discharge a plurality of colors of liquids; and
   a controller,
   wherein the controller is configured to:
      calculate a total discharge amount of the plurality of colors of liquids for a unit area of a recording medium based on discharge data for the unit area;
      determine whether the total discharge amount exceeds a predefined amount;
      in a case that the controller has determined that the total discharge amount exceeds the predefined amount, divide the discharge data into a plurality of pieces of divided discharge data, each of the pieces of divided discharge data indicating a total discharge amount which is not more than the predefined amount; and
      perform a plurality of divided discharges for the unit area based on the pieces of divided discharge data,
   wherein at least one of the plurality of colors of liquids is discharged from the head in one divided discharge included in the plurality of divided discharges, and
   the controller is configured to generate at least one of the plurality of pieces of divided discharge data in which at least one color of liquid is removed from the plurality of colors of liquids.

2. The liquid discharge apparatus according to claim 1, further comprising a conveyor configured to convey the recording medium,
   wherein the plurality of colors include a first color and a second color,
   wherein the unit area has a first position and a second position,
   wherein the plurality of divided discharges include a first divided discharge and a second divided discharge, the first divided discharge configured by a piece of discharge data related to the first color of liquid, the second divided discharge configured by a piece of discharge data related to the second color of liquid, and
   in a case that the first divided discharge is performed and the second divided discharge is performed after the first divided discharge without using the conveyor, the controller is configured to discharge the second color of liquid, in the second divided discharge, at the second position except for the first position where the first color of liquid is discharged in the first divided discharge.

3. The liquid discharge apparatus according to claim 1,
   wherein in a case that at least one of the plurality of pieces of divided discharge data is configured by a piece of discharge data related to liquids of not less than k colors (k: a natural number not less than two) included in the plurality of colors, the controller is configured to determine whether the number of the plurality of pieces of divided discharge data is smaller than a case in which the at least one of the plurality of pieces of divided discharge data is configured by a piece of discharge data related to a liquid(s) of (k−1) color(s) included in the plurality of colors, and
   in a case that the number of the plurality of pieces of divided discharge data is smaller than the case in which the at least one of the plurality of pieces of divided discharge data is configured by the discharge data related to the liquid(s) of (k−1) color(s) included in the plurality of colors, the controller is configured to maintain the plurality of pieces of divided discharge data configured by the discharge data related to the liquids of not less than k colors.

4. The liquid discharge apparatus according to claim 1,
   wherein the controller is configured to generate the plurality of pieces of divided discharge data, the total discharge amount of each of the pieces of divided discharge data being the predefined amount,
   in a case that the total discharge amount indicated by the last divided discharge data is less than the predefined amount, the controller is configured to determine whether the number of the plurality of pieces of divided discharge data increases in a case that a part of a configuration of a piece of discharge data configured by the not less than two colors of liquids is moved into the last divided discharge data, and
   in a case that the controller has determined that the number of the plurality of pieces of divided discharge data does not increase, the controller is configured to move the part of the configuration of the pieces of discharge data configured by the not less than two colors of liquids into the last divided discharge data.

5. The liquid discharge apparatus according to claim 1, further comprising a carriage holding the head,
   wherein the carriage configured to reciprocatingly move in a scanning direction, and
   wherein a length in the scanning direction of the unit area is equal to or less than a length in the scanning direction of an area where the carriage is moved.

6. The liquid discharge apparatus according to claim 5,
   wherein the unit area includes a first unit area and a second unit area that is arranged side by side with the first unit area in the scanning direction,
   the controller is configured to:
      calculate the total discharge amount for each of the first unit area and the second unit area;
      determine whether the total discharge amount exceeds the predefined amount in at least any one of the first unit area and the second unit area; and
      divide a piece of discharge data for a unit area included in one of the first unit area and the second unit area, when the controller has determined that the total discharge amount exceeds the predefined amount in at least any one of the first unit area and the second unit area, into the plurality of pieces of divided discharge data.

7. The liquid discharge apparatus according to claim 6,
wherein the scanning direction includes a first direction and a second direction, the second direction being opposite to the first direction, and
wherein the controller is configured to execute a bidirectional recording,
in the bidirectional recording, at least one color of liquid included in the plurality of colors of liquids is discharged from the head in a case that the carriage moves through a going route in the first direction and that the carriage moves through a returning route in the second direction, and
the plurality of pieces of divided discharge data include data for the going route and data for the returning route.

8. The liquid discharge apparatus according to claim 7,
wherein the predefined amount includes a first predefined amount and a second predefined amount, the first predefined amount used in the bidirectional recording and the second predefined amount used in a unidirectional recording, and
wherein the first predefined amount is larger than the second predefined amount,
in the unidirectional recording, at least one color of liquid included in the plurality of colors of liquids is discharged from the head in at least one of a case where the carriage moves through the going route and a case where the carriage moves through the returning route.

9. The liquid discharge apparatus according to claim 5,
wherein the head includes a plurality of nozzle rows arranged in the scanning direction and corresponding to the plurality of colors of liquids, and
the controller is configured to perform the plurality of divided discharges in an order starting from a liquid included in the plurality of colors of liquids and corresponding to a nozzle row belonging to the nozzle rows and positioned at an end at a first side in the scanning direction.

10. The liquid discharge apparatus according to claim 1,
wherein the plurality of pieces of divided discharge data include a first piece of divided discharge data and a second piece of divided discharge data,
wherein the first piece of divided discharge data is configured by a piece of discharge data related to liquids of not less than k colors (k: a natural number not less than two) included in the plurality of colors,
wherein a total discharge amount indicated by the second piece of divided discharge data is less than the predefined amount,
wherein the controller is configured to determine whether the number of the plurality of pieces of divided discharge data increases in a case that a part of the piece of discharge data included in the first piece of divided discharge data related to one color liquid is moved to the second piece of divided discharge data, and wherein in a case that the controller has determined that the number of the plurality of pieces of divided discharge data does not increase, the controller moves the part of the piece of discharge data included in the first piece of divided discharge data related to one color liquid to the second piece of divided discharge data.

11. A control method for controlling a liquid discharge apparatus provided with a head configured to discharge a plurality of colors of liquids, the method comprising:
calculating a total discharge amount of the plurality of colors of liquids for a unit area of a recording medium based on discharge data for the unit area;
determining whether the total discharge amount exceeds a predefined amount;
in a case the total discharge amount exceeds the predefined amount, dividing the discharge data into a plurality of pieces of divided discharge data, each of the pieces of divided discharge data indicating a total discharge amount which is not more than the predefined amount; and
performing a plurality of divided discharges for the unit area based on the pieces of divided discharge data,
wherein at least one of the plurality of colors of liquids is discharged from the head in one divided discharge included in the plurality of divided discharges, and
at least one of the plurality of pieces of divided discharge data in which at least one color of liquid is removed from the plurality of colors of liquids is generated.

12. A non-transitory computer-readable medium storing a program that is executable by a controller of a liquid discharge apparatus that includes: a head configured to discharge a plurality of colors of liquids and a controller, the program, when executed by the controller, causing the liquid discharge apparatus to:
calculate a total discharge amount of the plurality of colors of liquids for a unit area of a recording medium based on discharge data for the unit area;
determine whether the total discharge amount exceeds a predefined amount;
in a case that the controller has determined that the total discharge amount exceeds the predefined amount, divide the discharge data into a plurality of pieces of divided discharge data, each of the pieces of divided discharge data indicating a total discharge amount which is not more than the predefined amount; and
perform a plurality of divided discharges for the unit area based on the plurality of pieces of divided discharge data,
wherein at least one of the plurality of colors of liquids is discharged from the head in one divided discharge included in the plurality of divided discharges, and
at least one of the plurality of pieces of divided discharge data in which at least one color of liquid is removed from the plurality of colors of liquids is generated.

* * * * *